United States Patent
Ifergan

(10) Patent No.: US 7,380,935 B2
(45) Date of Patent: Jun. 3, 2008

(54) MECHANICAL UNIVERSAL HINGE

(75) Inventor: Nonu Ifergan, Mont-Royal (CA)

(73) Assignee: Chic Optic, Inc., Mont-Royal (CA)

( * ) Notice: Subject to any disclaimer, the term of this patent is extended or adjusted under 35 U.S.C. 154(b) by 0 days.

(21) Appl. No.: 11/531,180

(22) Filed: Sep. 12, 2006

(65) Prior Publication Data
US 2008/0074609 A1 Mar. 27, 2008

(51) Int. Cl.
G02C 5/22 (2006.01)
(52) U.S. Cl. .................. 351/153; 351/121; 16/228
(58) Field of Classification Search ............... 351/121, 351/153; 16/228
See application file for complete search history.

(56) References Cited

U.S. PATENT DOCUMENTS

| | | | |
|---|---|---|---|
| 3,531,190 | A | 9/1970 | LeBlanc |
| 4,494,834 | A | 1/1985 | Tabacchi |
| 4,689,851 | A | 9/1987 | Beyer |
| 4,953,966 | A | 9/1990 | Segoshi et al. |
| 5,321,442 | A | 6/1994 | Albanese |
| 5,517,258 | A | 5/1996 | Naito |
| 5,568,207 | A | 10/1996 | Chao |
| 5,640,217 | A | 6/1997 | Hautcoeur et al. |
| 5,877,838 | A | 3/1999 | Chao |
| 5,882,101 | A | 3/1999 | Chao |
| 5,883,688 | A | 3/1999 | Chao |
| 5,883,689 | A | 3/1999 | Chao |
| 5,889,575 | A | 3/1999 | Wang |
| 5,929,964 | A | 7/1999 | Chao |
| 6,116,730 | A | 9/2000 | Kwok |
| 6,464,354 | B1 | 10/2002 | Chen et al. |
| 6,513,926 | B1 | 2/2003 | Kizu |
| 6,530,660 | B1 | 3/2003 | Chao |
| 6,618,901 | B1 * | 9/2003 | Wang-Lee .................. 16/228 |
| 6,721,991 | B2 * | 4/2004 | Dioguardi .................. 16/228 |
| 7,073,904 | B2 | 7/2006 | Chene et al. |
| 2002/0085171 | A1 | 7/2002 | Wang-Lee |
| 2003/0020867 | A1 * | 1/2003 | Dei Negri et al. .......... 351/153 |
| 2005/0078272 | A1 | 4/2005 | Quehin |
| 2005/0163560 | A1 | 7/2005 | Chene et al. |

(Continued)

FOREIGN PATENT DOCUMENTS

CA 2190875 C 5/1997

(Continued)

*Primary Examiner*—Huy K Mai
(74) *Attorney, Agent, or Firm*—Blake, Cassels & Graydon LLP; John R. S. Orange; Brett J. Slaney

(57) ABSTRACT

A hinge assembly is provided for connecting the temple of an eyeglass to a lens support assembly. The hinge assembly comprises a cam member with a pair of oppositely directed cam surfaces disposed in orthogonal planes. The assembly also comprises a pair of pivots extending normal to respective ones of the planes and defining orthogonal pivot axes for relative movement between the cam member and the main frame and the temple respectively. The hinge has a pair of followers, each associated with a respective one of the cam surfaces; and a pair of biasing members acting on the followers to maintain the followers in contact with the cam surfaces. An eyeglass comprising the hinge assembly is also provided. The hinge assembly allows a compound movement between the main frame and the temple that can accommodate the abnormal loading that might be placed on the eyeglasses.

17 Claims, 6 Drawing Sheets

U.S. PATENT DOCUMENTS

2006/0050226 A1    3/2006    Chene et al.

FOREIGN PATENT DOCUMENTS

| CA | 2181020 A1 | 1/1998 |
| CA | 2235088 | 10/1998 |
| CA | 2235823 | 10/1998 |
| CA | 2235897 | 11/1998 |
| CA | 2236025 | 4/1999 |
| CA | 2258142 | 2/2000 |
| CA | 2347052 A1 | 4/2000 |
| FR | 2816072 B1 | 1/2003 |
| JP | 61041117 A2 | 2/1986 |
| WO | WO 03/087917 A1 | 10/2003 |
| WO | WO 2004/113996 A1 | 12/2004 |
| WO | WO 2005/121870 A2 | 12/2005 |

* cited by examiner

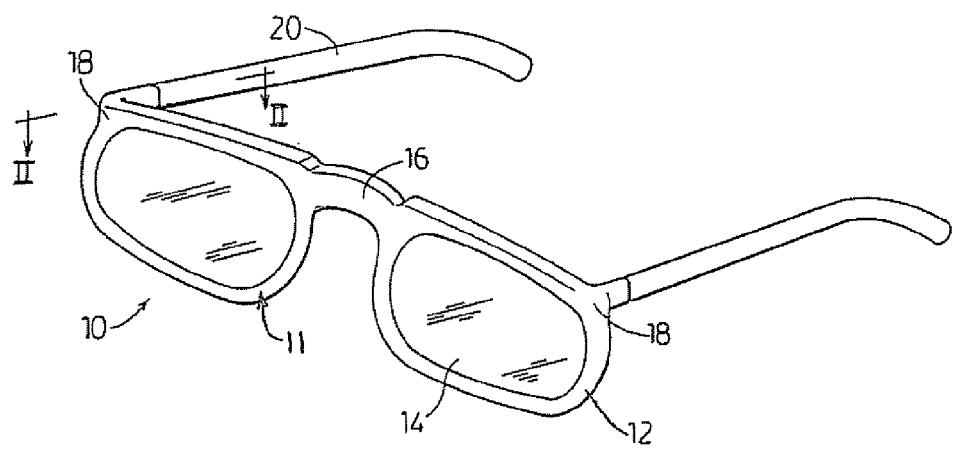
FIG.1
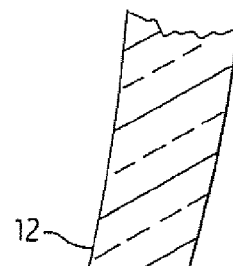
FIG.2
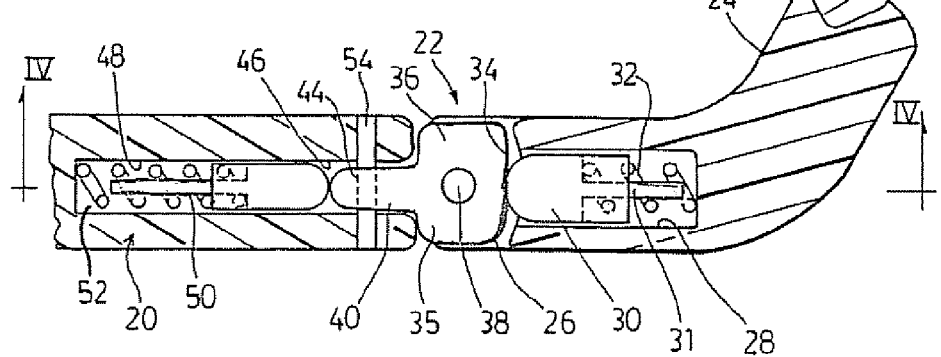

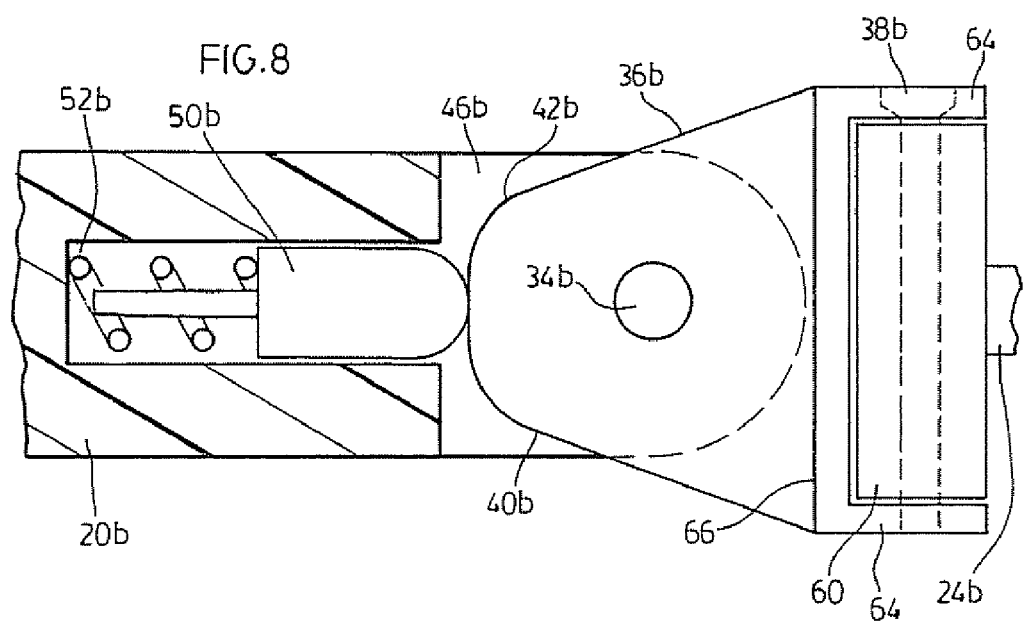
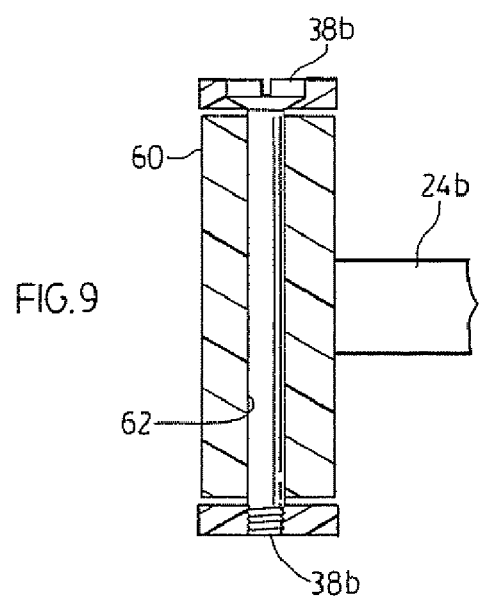

MECHANICAL UNIVERSAL HINGE

FIELD OF THE INVENTION

The present invention relates to eyeglasses and to hinges for an eyeglass.

BACKGROUND OF THE INVENTION

Eyeglasses typically comprise a frame having a pair of apertures to support lenses and a pair of temples that extend rearwardly from the front portion of the spectacle frame for engagement with the users' ears. The temples are normally connected to the front portion of the spectacle frame by a hinge to allow the temples to be folded behind the lenses in the frame for storage when not in use.

In conventional eyeglasses, the hinge permits folding in one direction but inhibits movement of the temples beyond a position in which they are generally perpendicular to the plane of the lenses carried by the spectacle frame. In that position, the hinge is relatively vulnerable to abnormal loads that inevitably occur in normal use. Such loads may occur for example, from accidental contact with the eyeglasses, from improper storage when not in use or may be exerted by the side of a user's face where the overall width of the wearer's face is broader than the width of the spectacle frame. Inevitably, the hinge arrangement can be one of the more vulnerable components of the eyeglasses and accordingly, damage frequently occurs.

U.S. Pat. No. 4,494,834 to Tabacchi discloses a resilient hinge in which a hinge block is mounted for sliding movement relative to the temple. A spring opposes such movement to hold the hinge block in the temple. If the temple is pulled outwardly, the outer edge of the temple abuts the outer edge of the frame and provides a fulcrum about which the temple rotates. The spring permits the movement and avoids bending of the temple.

Similarly, U.S. Pat. No. 4,689,851 to Beyer shows a hinge arrangement that has a sliding support within the temple to permit lateral outward motion.

U.S. Pat. No. 7,073,904, U.S. Publication No. 2005/0163560 and U.S. Pat. No. 6,168,341 to Chene et al. show a number of variants in the placement of the type of hinge shown in the above two U.S. patents.

It is therefore an object of the present invention to provide a hinge arrangement for a pair of eyeglasses in which the above disadvantages are obviated or mitigated.

SUMMARY OF THE INVENTION

In one aspect, an eyeglass comprising a lens support assembly is provided. The eyeglass comprises a pair of temples extending from the lens support to support the eyeglass on a user, and a hinge assembly to connect respective ones of the temples to the lens support assembly frame, each of the hinge assemblies comprising a pair of mutually perpendicular pivot axes to permit movement between the temples and the lens support assembly about the substantially perpendicular axes, and a biasing element operable about at least one of the axes to maintain the temple in a stable position relative to the lens support assembly.

In another aspect, a hinge assembly is provided for connecting a temple to the end piece of the spectacle frame. The hinge assembly comprises a cam member with a pair of oppositely directed cam surfaces disposed in orthogonal planes; a pair of pivots extending normal to respective ones of the planes and defining orthogonal pivot axes for relative movement between the cam member and the end piece of the spectacle frame and the temple respectively; a pair of followers, each associated with a respective one of the cam surfaces; and a pair of biasing members acting on the followers to maintain the followers in contact with the cam surfaces.

BRIEF DESCRIPTION OF THE DRAWINGS

Embodiments of the invention will now be described by way of example only with reference made to the appended drawings wherein:

FIG. 1 is a perspective view of a pair of eyeglasses.

FIG. 2 is a view on the line II-II of FIG. 1.

FIG. 8 is a section on the line VIII-VIII of FIG. 7.

FIG. 9 is a view on the line IX-IX of FIG. 7.

Figure 3:
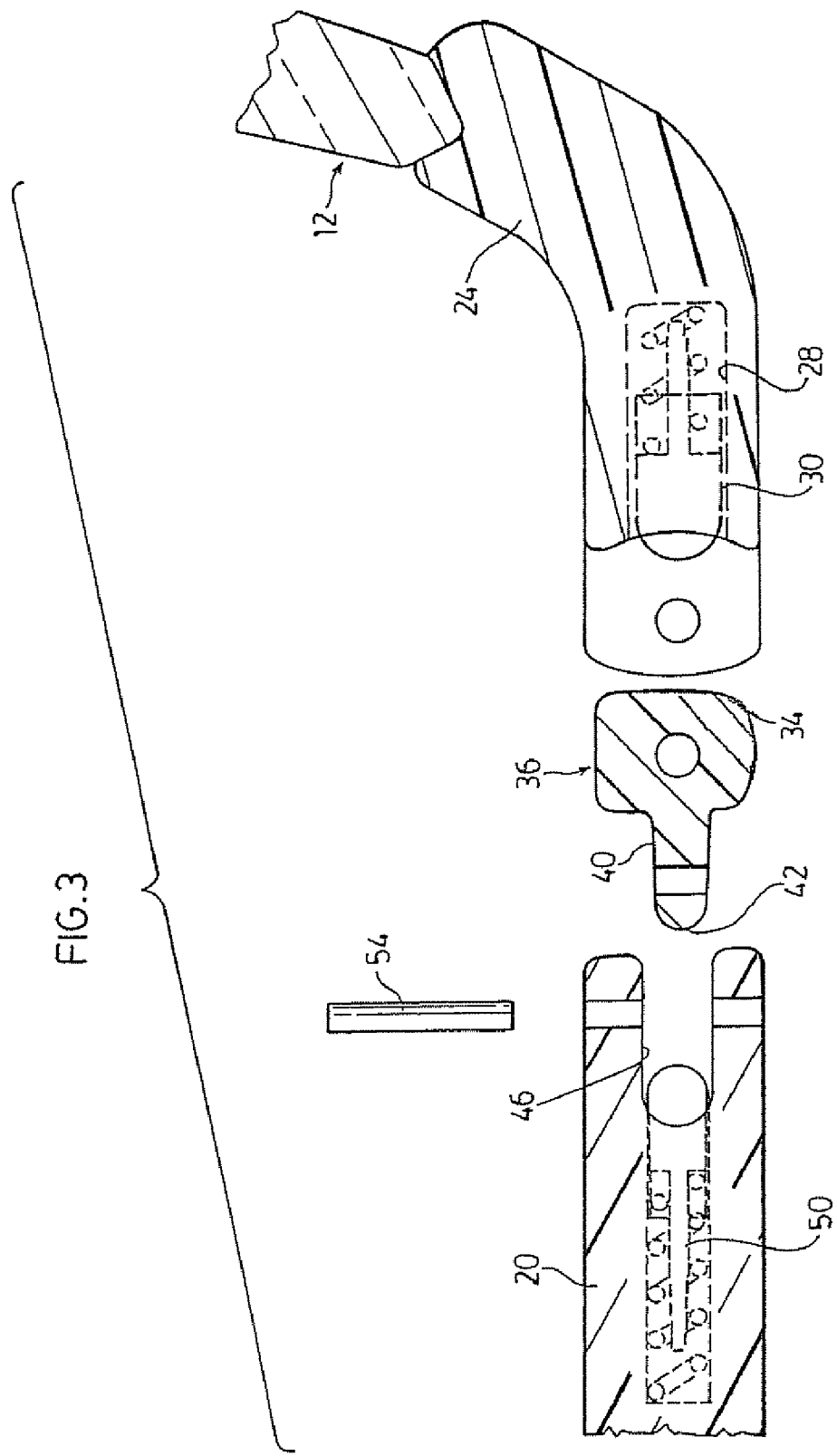
FIG. 3 is an exploded view of the arrangement shown in FIG. 2.
Figure 4:
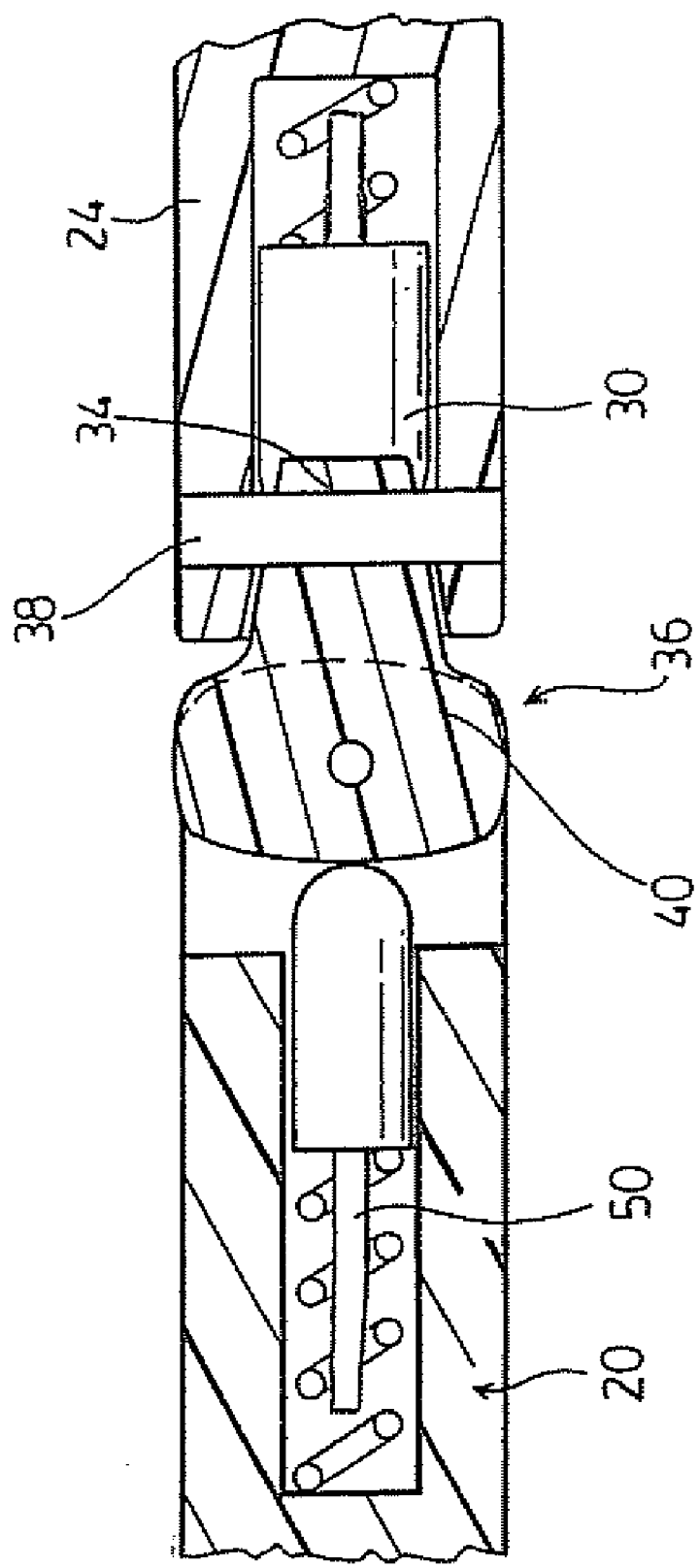
FIG. 4 is a view on the line IV-IV of FIG. 2.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

Referring now to the drawings, and initially to FIGS. 1 to 4, a pair of eyeglasses incorporating a hinge in accordance with one embodiment of the present invention may comprise a laterally extending lens support assembly 11 and a pair of temples 20. In the embodiment of FIGS. 1 to 4 the lens support assembly is defined by a frame 11. The spectacle frame comprises apertures to receive lenses 14, defined by the lens rim 12. The eyeglass frame includes a bridge 16 and a pair of end pieces 24 that extend from the sides 18 of the eye rim 12. A pair of temples 20 generally extend rearwardly to the user's temple region or ears and are connected to the frame 11 containing the lens rim 12 at the end pieces 24 by a hinge assembly 22 shown in greater detail in FIGS. 2 through 4.

The hinge assembly 22 is located in the end piece 24 generally formed as an extension of the sides 18. The end piece 24 is connected, attached or formed as a single piece at one end to the eye rim 12 and has a slot 26 formed at the opposite end. A bore 28 is formed in the end piece 24 that extends inwardly from the slot 26. The bore 28 houses a follower 30 which is biased out of the bore 28 by a spring 32. The follower includes a cylindrical tail 31 that passes within the spring 32 so as to locate the spring 32 relative to the follower. The follower 30 bears against a cam surface 34 that is formed on the periphery of a flange 35 of a cam member 36. The cam member 36 is received in the slot 26 and pivotally secured to the end piece 24 by a pin 38 that defines a first pivot axis.

The cam member 36 has a rearwardly extending tongue 40 that is delimited by a second cam surface 42. The tongue 40 is generally perpendicular to the flange 35 and has a bore 44 disposed at an axis perpendicular to the pin 38. The tongue 40 is received in a slot 46 formed at one end of the temple 20. A bore 48 extends from the slot 46 and houses a follower 50 that is free to slide within the bore 48. The follower 50 has a rearwardly projecting cylindrical tail 51 that is located within a spring 52. Spring 52 biases the follower 50 out of the bore 48 and into engagement with the cam surface 42. The cam member 36 is connected to the temple 20 by a pin 54 that extends through the bore 44 and into aligned bores 56 intersecting the slot 46 to define a second pivot axis. The first and second axes are substantially perpendicular to one another to permit movement between the main frame and temple in mutually perpendicular planes and thereby provide universal movement.

Each of the cam surfaces 34, 42 is profiled to provide a stable disposition of the temple 20 relative to the main frame 12 when generally perpendicular to one another. In a preferred embodiment, the cam surface has a central portion that is at a minimum radius from the respective axis. The cam surface progressively increases in radius to either side of the central portion to provide a progressively increasing resistance to movement.

Figure 5:
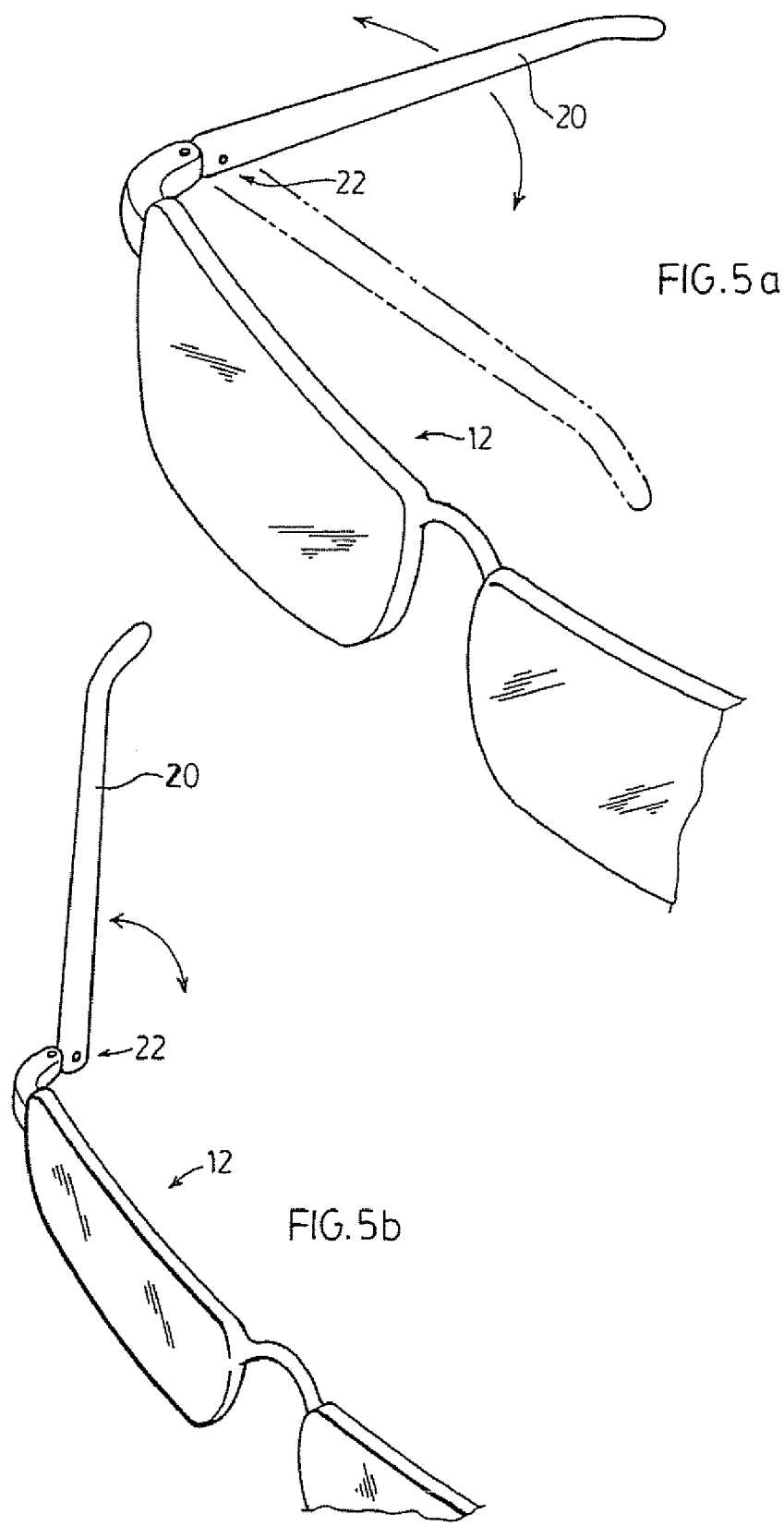
FIGS. 5A-B is a pair of views showing alternate configurations of the hinge arrangement shown in FIGS. 2-4.

The temple 20 may be folded, as shown in FIG. 5a, to a stored position by rotation of the temple 20 about the axis provided by the pin 38. As the temple 20 is moved inwardly, the cam member 36 rotates about the pin 38 and overcomes any bias imposed by the follower 30 on the cam surface 34. In some circumstances, the cam surface 34 may be part circular over the movement required to store the temples 20 so as to provide a uniform resistance to movement caused by friction of the follower 30 across the cam surface 34. Alternatively, the cam surface 34 may be profiled to provide resistance to movement from the stable position over a certain range of movement and then a bias to the stored position once that range of movement has been exceeded.

The arrangement of the pin 38 and cam member 36 also permits the temple 20 to be moved outwardly beyond the normal position to accommodate abnormal lateral loads. Such a load placed on the temple 20 causes rotation of the cam member 36 in the opposite direction about the pin 38 and causes displacement of the follower 30 against the bias of the spring 32. The temples 20 are able to move to accommodate the abnormal loading but upon removal of that loading, the bias of the spring 32 will return the cam member to its stable position. During such movement, the tail 31 is located within the spring 32 allowing it to compress and expand. The tail 31 assists in locating the spring 32 in the chamber 28 and also assists during assembly to hold the spring in situ.

The provision of the pin 54 also enables the temples to be displaced vertically in either direction relative to the plane of the lenses 14, as shown in FIG. 5b. The cam surface 42 is profiled to provide a stable position with the temples 20 extending generally perpendicular to the plane of the lenses 14. However, the pin 54 permits pivotal movement of the temple relative to the cam member 34 and thus movement in a vertical plane. Movement about the pin 54 causes displacement to the follower 50 against the bias of the spring 52 to provide a restorative force when the loading on the temple is removed. The tail 51 again locates the spring 52, both during operation and assembly.

It will be appreciated therefore that the disposition of the pins 38 and 54 along mutually perpendicular axes allows a compound movement between the main portions of the eyeglass frame and temples 20 that can accommodate the abnormal loading that might be placed on the eyeglasses 10. However, the provision of the cam surfaces 34, 42 enables the stable configuration of the eyeglasses 10 to be maintained under normal conditions and facilitates folding of the temples 20 to the stored position. It will be appreciated that the relative disposition of the axes may be reversed from that shown, i.e. the first axis is disposed horizontally and the second vertically, if preferred.

Figure 6:
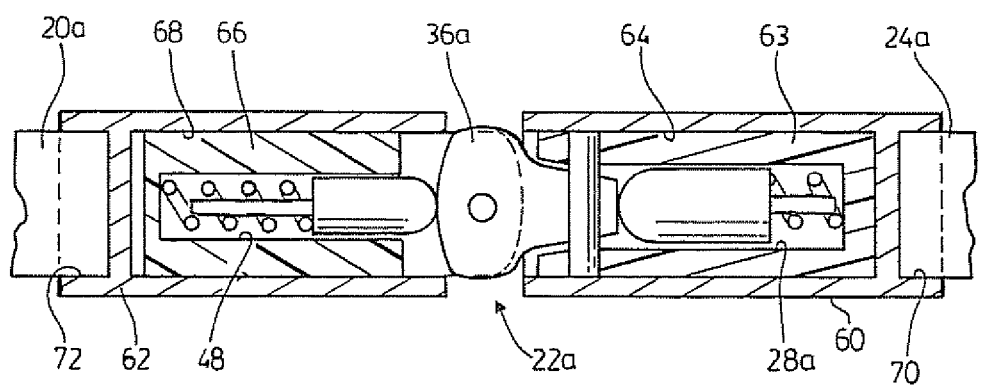
FIG. 6 is a sectional view similar to FIG. 4 of an alternative arrangement of a hinge.

An alternative arrangement is shown in FIG. 6 in which like components will be identified by like reference numbers with a suffix "a" added for clarity. In the arrangement shown in FIG. 6, the hinge assembly 22a is accommodated within a pair of exterior housings 60, 62. The bore 28a is formed within a body 63 that is dimensioned to fit within a cavity 64 formed within the housing 60. Similarly, the bore 48a is formed within a body 66 that is dimensioned to fit within a cavity 68 formed in the housing 62. The cam member 36a is pivotally connected to each of the bodies 24a, 66 to form a unitary construction. The housings 60, 62 are each provided with a socket 70, 72 respectively to which the arm 24a and temple 20a may be attached by adhesive or pins or other suitable means. In this way, the hinge 22a provides a unitary structure to which temples 20a and frames 12a may be secured to provide the flexibility of the hinge 22a.

Figure 7:
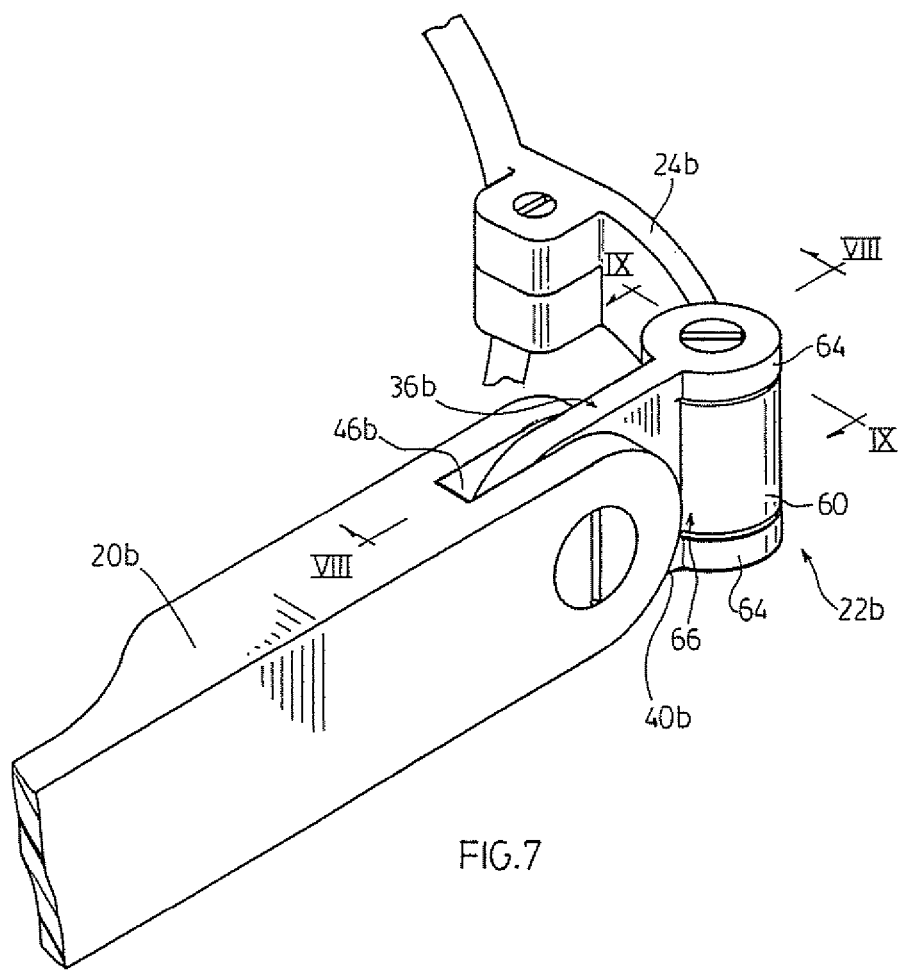
FIG. 7 is a perspective view of a portion of a further embodiment of a hinge for eyeglasses.

A further embodiment of the hinge is shown in FIGS. 7 through 9 with like components being identified with like reference numerals and a suffix b added for clarity. In the arrangement shown in FIG. 7, the hinge assembly 22b has a bushing 60 formed at one end of the arm 24b with a central bore 62 to receive pin 38b. The pin 38b extends between opposite arms 64 of a yolk 66 that is formed as part of the cam member 36b. The pin 38b is threaded into one of the arms 64 and recessed in a socket in the other arm 64 to provide a flush surface and allow relative pivotal movement between the cam member 36b and the arm 24b. A biasing mechanism similar to that shown in FIG. 2 is incorporated in the yoke 66 to bear against the bushing 60 and bias the temples to a predetermined position. Alternatively, a spring may be incorporated between the bushing 60 and yoke 66 about the pin 38b to provide the bias.

The cam member 36b has a rearwardly extending tongue 40b that is received in a slot 46b formed at one end of the temple 20b. A pin 54b extends between the temple 20b and the cam member 36b to pivotally connect them. The pin 54b is perpendicular to the pin 38b to permit relative pivotal movement about mutually perpendicular axis.

The cam member 36b has a cam surface 42b which bears against a follower 50b biased into engagement with the cam surface 42b by a spring 52b. The cam surface 42b is profiled to bias the temple 20b to a normal horizontal position but may yield against the bias of the spring 52b to accommodate displacement in a vertical plane about the pin 54b. Similarly, the temple may rotate in a horizontal plane by relative pivotal movement about the pin 38b with the biasing device returning the temples to the predetermined position.

In the arrangement of FIGS. 7 through 9, the construction of the hinge assembly 22b is simplified to facilitate production.

Although the invention has been described with reference to certain specific embodiments, various modifications thereof will be apparent to those skilled in the art without departing from the spirit and scope of the invention as outlined in the claims appended hereto.

For example it is well known in the art that eyeglasses (e.g., spectacle frames, sunglasses and other types of eyewear) are available in a diverse array of types, shapes, sizes, and materials. Generally, eyeglasses come into three basic types—full, semi or half-rimless, and rimless. In a "full" eyeglass frame, the lens support assembly is comprised of a lens rim that completely encircles the lens. In a semi-rimless eyeglass frame there is no rim encircling both the bottom and top of the lens. Rimless eyeglass frames normally have no rim around the lens. For the most part, rimless eyeglasses come in three pieces (two end pieces and the nose bridge), although other variations also exist. In this configuration, the lenses form part of the of the lens support assembly. Generally, in a rimless configuration, each lens is routinely drilled so that the components fit snugly into the lens. While the invention is described using one specific example of spectacle frames (e.g., rimmed), it can also be adapted and used for semi-rimless, rimless frames. For the purpose of ease and convenience, the embodiments were illustrated and described using a "full" eyeglass frame but each figure could be illustrated with any of the varying types of construction detailed above or others known in the art.

Also, while the above descriptions and figures have been described in a specific manner, it can be appreciated that the orientation of individual components can be reversed to achieve the same result.

The entire disclosures of all references recited above are incorporated herein by reference.

What is claimed is:

1. An eyeglass comprising a lens support assembly; a pair of temples extending from said lens support assembly to support the eyeglass on a user, and a hinge assembly to connect respective ones of said temples to said lens support assembly, each of said hinge assemblies comprising a pair of mutually perpendicular pivot axes to permit movement between said temples and said lens support assembly about said substantially perpendicular axes, and a biasing element operable about at least one of said axes to maintain said temple in a stable position relative to said lens support assembly, said biasing element acting to return said temple to a predetermined position.

2. An eyeglass according to claim 1 wherein said predetermined position is centrally located within a range of movement provided by said one axis.

3. An eyeglass according to claim 1, wherein said hinge assembly includes a cam member movable with one of said temple and said lens support assembly frame and said biasing element is associated with the other of said temple and said lens support assembly and acts against a cam surface on said cam member.

4. An eyeglass according to claim 3, wherein said cam surface shaped to return said temple to a predetermined position relative to said lens support assembly.

5. An eyeglass according to claim 4 wherein a central portion of said cam surface has a minimum radius from said pivot axis and progressively increases in radius to either side of said central portion.

6. An eyeglass according to claim 5 wherein said biasing element includes a follower engaging said cam surface and a spring biasing said follower against said cam surface.

7. An eyeglass according to claim 6 wherein said follower is slidably supported within said other of said temple and said lens support assembly.

8. An eyeglass according to claim 7 wherein said biasing element is a spring supported on an extension of said follower.

9. An eyeglass according to claim 8 wherein said spring and said follower are located within an elongate bore within said other of said temple and said lens support assembly and retained in said bore by a pin defining one of said pivot axes.

10. A hinge assembly for connecting a temple to a lens support assembly, said hinge assembly comprising a cam member with a pair of oppositely directed cam surfaces disposed in orthogonal planes; a pair of pivots extending normal to respective ones of said planes and defining orthogonal pivot axes for relative movement between said cam member and said lens support assembly and said temple respectively; a pair of followers, each associated with a respective one of said cam surfaces; and a pair of biasing members acting on said followers to maintain said followers in contact with said cam surfaces.

11. A huge assembly according to claim 10 wherein said cam surfaces have a progressively increasing radius to either side of a central portion to provide a stable position for said cam surface.

12. A huge assembly according to claim 11 wherein each of said followers are slidable in a radial direction relative to respective ones of said axes.

13. A hinge assembly according to claim 12 wherein each of said biasing members is a spring acting to bias said follower toward the respective axis.

14. A hinge assembly according to claim 13 wherein said spring is mounted on an extension of said follower.

15. A hinge assembly according to claim 14 wherein each of said followers is slidably mounted in a respective housing and retained by a respective one of said pivots.

16. A hinge assembly according to claim 15 wherein said housings are integrally formed with said temple and said lens support assembly.

17. A hinge assembly according to claim 15 wherein each of said housings includes a docket to receive said temple and said lens support assembly.

* * * * *